US008929067B2

(12) United States Patent
Wu et al.

(10) Patent No.: US 8,929,067 B2
(45) Date of Patent: Jan. 6, 2015

(54) PORTABLE ELECTRONIC DEVICE

(75) Inventors: Chun-Liang Wu, Taipei (TW);
Ying-Chi Chou, Taipei (TW);
Hung-Sung Pan, Taipei (TW);
Chih-Wei Lu, Taipei (TW);
Long-Cheng Chang, Taipei (TW);
Po-Chin Yu, Taipei (TW); Wei-Chih Hsu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 230 days.

(21) Appl. No.: 13/483,054

(22) Filed: May 30, 2012

(65) Prior Publication Data

US 2012/0307432 A1 Dec. 6, 2012

Related U.S. Application Data

(60) Provisional application No. 61/491,313, filed on May 30, 2011.

(51) Int. Cl.
*H05K 5/00* (2006.01)
*H05K 7/00* (2006.01)
*G06F 1/16* (2006.01)

(52) U.S. Cl.
CPC .............. *G06F 1/1626* (2013.01); *G06F 1/166* (2013.01); *G06F 1/1684* (2013.01)
USPC ............. 361/679.55; 361/679.45; 361/679.59

(58) Field of Classification Search
CPC ... G06F 1/1613; G06F 1/1626; G06F 1/1633; G06F 1/1675; G06F 1/1679
USPC .......................... 361/679.45, 679.55, 679.59
See application file for complete search history.

(56) References Cited

U.S. PATENT DOCUMENTS

| 7,111,948 B2* | 9/2006 | Lee et al. | 353/119 |
| 2008/0253081 A1* | 10/2008 | Tracy et al. | 361/687 |
| 2012/0044624 A1* | 2/2012 | Hoffman et al. | 361/679.21 |

FOREIGN PATENT DOCUMENTS

| TW | I275341 | 3/2007 |
| TW | D137763 | 11/2010 |

OTHER PUBLICATIONS

"Office Action of Taiwan Counterpart Application", issued on May 20, 2014, p. 1-p. 7.

* cited by examiner

*Primary Examiner* — Anthony Haughton
(74) *Attorney, Agent, or Firm* — Jianq Chyun IP Office

(57) ABSTRACT

A portable electronic device including a main body and a connector module is provided. The main body has a central region and a fringe region. A thickness of the central region is greater than a thickness of the fringe region, and the central region has a containing cavity. The connector module is slidably disposed in the containing cavity of the main body, and moves between an operation position and an accommodation position in relative to the main body.

11 Claims, 16 Drawing Sheets

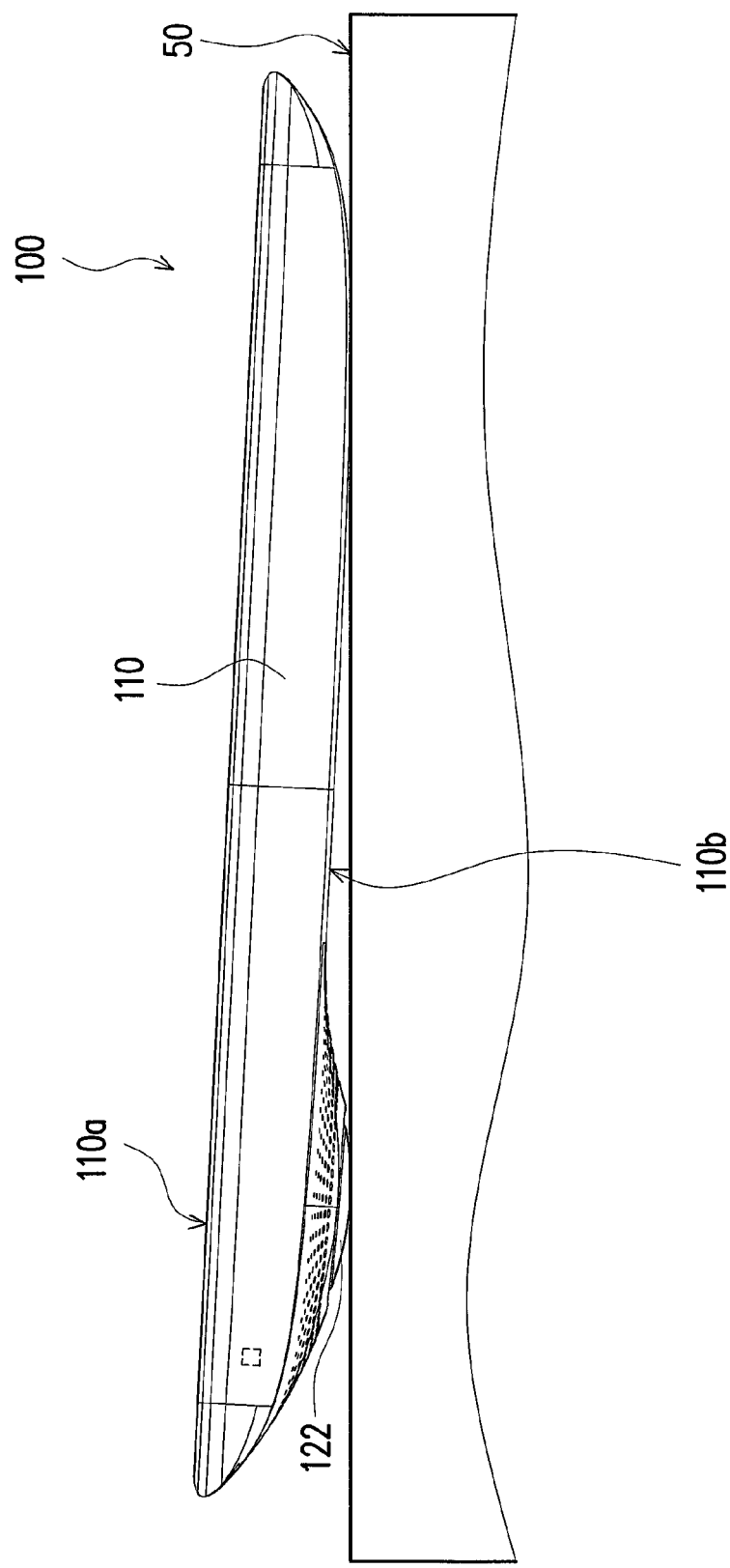

PORTABLE ELECTRONIC DEVICE

CROSS-REFERENCE TO RELATED APPLICATION

This application claims the priority benefits of U.S. provisional application Ser. No. 61/491,313, filed on May 30, 2011. The entirety of the above-mentioned patent applications is hereby incorporated by reference herein and made a part of this specification.

BACKGROUND OF THE INVENTION

1. Field of the Invention

The invention relates to a portable electronic device, and more particularly, to a portable electronic device with a connector module moving between an operation position and an accommodation position.

2. Description of Related Art

In recent years, as the electronic technology has continuously been developed, user-friendly electronic products with power functions also constantly have been brought forth the new to replace the old ones. For example, notebook computers have already gradually replaced desktop computers and become the mainstream of Computer, Communication and Consumer Electronics (3C) markets. Tablet personal computers are a type of electronic products across the communication market and the computer market. Tablet personal computers are not only having a display screen greater than smart mobile phones, and combining the touch control technology to obtain an interactive user interface more favourable than notebook computers and a light-slim size for users to carry more conveniently.

In general, when a tablet personal computer is horizontally placed on a working plane, the display surface thereof is unable to provide a comfortable visual or operational angle for users. When the users watch a film or perform a touch control operation through the table personal computer, an additional holder is often employed to support the tablet personal computer in order for the tablet personal computer to have an appropriate tilt angle, thereby causing inconvenience for users to utilize.

SUMMARY OF THE INVENTION

The invention is directed to a portable electronic device, and a user may adjust a tilt angle of the portable electronic device conveniently.

The invention provides a portable electronic device including a main body and a connector module. The main body has a central region and a fringe region, a thickness of the central region is greater than a thickness of the fringe region, and the central region has a containing cavity. The connector module is slidably disposed in the containing cavity of the main body, and moves between an operation position and an accommodation position in relative to the main body.

In an embodiment of the invention, when the connector module is located at the operation position, the connector module is to provide a supporting force to support the main body away from a working plane.

In an embodiment of the invention, a depth of the containing cavity is greater than the thickness of the fringe region.

In an embodiment of the invention, the connector module has an input/output connection port, when the connector module is located at the operation position, the input/output connection port is exposed outside the main body, and when the connector module is located at the accommodation position, the input/output connection port is hidden in the main body.

In an embodiment of the invention, when the connector module is located at the operation position and supported the main body away from the working plane, an included angle is formed between the main body and the working plane.

In an embodiment of the invention, the connector module has a connecting plane, and the connector module moves between an operation position and an accommodation position in a direction approximately paralleled to the connecting plane.

In an embodiment of the invention, the connector module further includes a stopping element, a housing and a positioning element. The stopping element is disposed on the main body, and has a first stopping portion and a second stopping portion. The housing is slidably disposed in the main body. The positioning element is slidably disposed in the housing and leaned against the first stopping portion to drive the housing to be accommodated in the main body. When the positioning element moves away from the first stopping portion, the housing is suitable to protrude out from the main body, and the positioning element slides in relative to the housing and leans against the second stopping portion to prevent the housing being restored into the main body.

In an embodiment of the invention, when the positioning element moves away from the second stopping portion and the housing is restored into the main body, the positioning element slides in relative to the housing and leans against the first stopping portion.

In an embodiment of the invention, the connector module further includes a knob, and the knob is to drive the positioning element to move.

In an embodiment of the invention, the housing is slidably disposed in the main body along a first direction, the positioning element is slidably disposed in the housing along a second direction, the knob is slidably disposed in the housing along the second direction, and the first direction is perpendicular to the second direction.

In an embodiment of the invention, the connector module further includes a first elastic element connected between the housing and the main body. When the positioning element leans against the first stopping portion, the first elastic element stores an elastic potential energy. When the positioning element moves away from the first stopping portion, the first elastic element releases the elastic potential energy and drives the housing to protrude out from the main body.

In an embodiment of the invention, the main body has a slot, a side of the housing has a protrusion, the protrusion is slidably disposed in the slot, and the slot limits a moving range of the protrusion.

In an embodiment of the invention, the connector module further includes a second elastic element connected between the main body and the positioning element. When the positioning element slides in relative to the housing, the second elastic element stores an elastic potential energy, and the second elastic element is suitable to release the elastic potential energy to drive the positioning element to be restored.

In an embodiment of the invention, the second stopping portion has a guiding fillet, and the positioning element is suitable to move away from the second stopping portion along the guiding fillet.

In an embodiment of the invention, the connector module further includes a position-limiting element, a housing and a positioning element. The position-limiting element is disposed in the main body, the position-limiting element has a track and the track has a position-limiting portion. The housing is slidably disposed in the main body. The positioning element is slidably disposed in the housing, and drives the housing to move. The positioning element has a moving portion. When the moving portion moves to the position-limiting portion along the track, the moving portion is to interfere with the position-limiting portion to stop moving and drive the housing to be accommodated in the main body. When the moving portion moves away from the position-limiting portion along the track, the housing is suitable to protrude out from the main body.

In an embodiment of the invention, the connector module has a stopping element disposed on the main body, and the positioning element has a stopping portion. When the moving portion moves away from the track, the stopping element and the stopping portion interfere to each other to prevent the housing being restored into the main body.

In an embodiment of the invention, the connector module has a button slidably disposed in the housing and driving the positioning element to move.

In an embodiment of the invention, the positioning element has an inclined plane, the button is suitable to push the inclined plane along a first direction to drive the positioning element to slide along a second direction in relative to the housing.

In an embodiment of the invention, the housing is slidably disposed in the main body along a first direction, the positioning element is slidably disposed in the housing along a second direction, the button is slidably disposed in the housing along the first direction, and the first direction is perpendicular to the second direction.

In an embodiment of the invention, the connector module further includes a first elastic element connected between the housing and the main body, wherein when the moving portion and the position-limiting portion interfere to each other, the first elastic element stores an elastic potential energy, and when the moving portion moves away from the position-limiting portion along the track, the first elastic element releases the elastic potential energy and drives the housing to protrude out from the main body.

In an embodiment of the invention, the connector module further includes a second elastic element connected between the main body and the positioning element. When the moving portion and the position-limiting portion interfere to each other, the second elastic element stores an elastic potential energy, and when the moving portion moves away from the position-limiting portion along the track, the second elastic element releases the elastic potential energy and drives the positioning element to slide in relative to the housing.

According to the above description, in the portable electronic device of the invention, the connector module is slidably disposed on the central region of the main body. When the connector module is at the accommodation position, the connector module may hide in the containing cavity of the central region, hence the connector module is not required to be disposed on the fringe region with thinner thickness. When the connector module is at the operation position, the connector module may support the portable electronic device in order for the portable electronic device to have an appropriate tilt angle for a user to watch or operate. Thereby, the user may adjust the tilt angle of the portable electronic device conveniently to improve the convenience and comfort for utilizing the portable electronic device.

In order to make the aforementioned and other features of the disclosure comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A is a side view illustrating a portable electronic device located on a working plane in FIG. 1A.

DESCRIPTION OF THE EMBODIMENTS

Figure 1A:
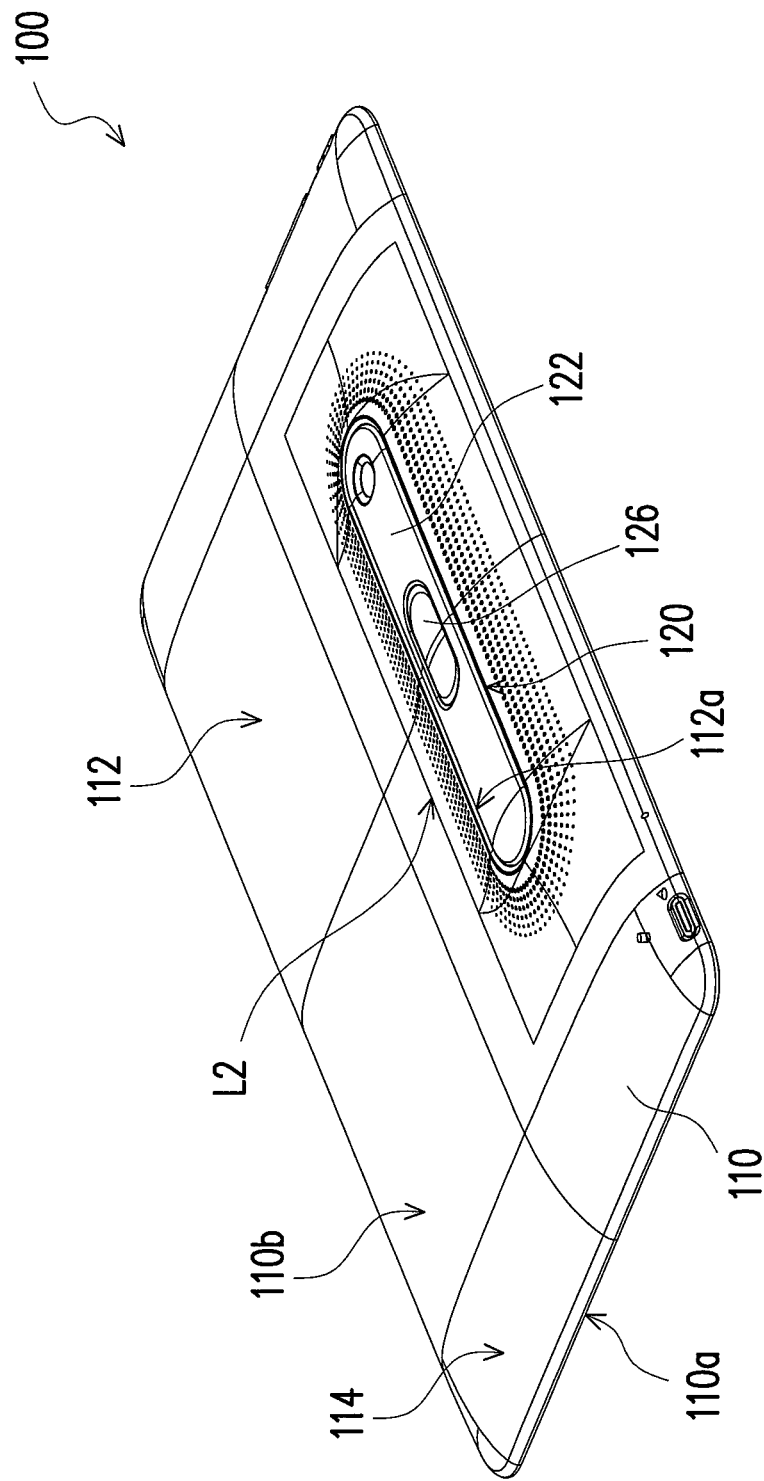
FIG. 1A is a three-dimensional view illustrating a portable electronic device according to an embodiment of the invention.
Figure 1B:
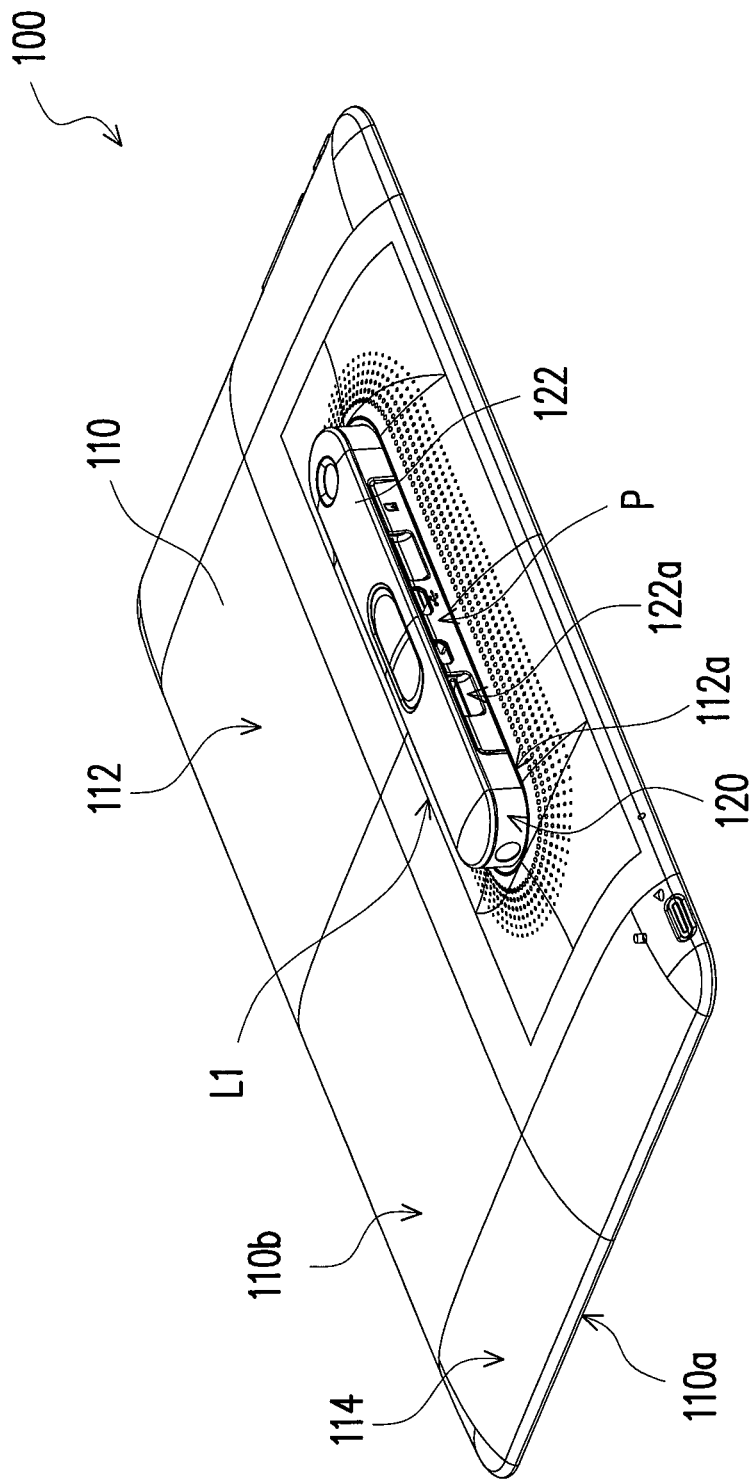
FIG. 1B is a three-dimensional view illustrating a connector module protruded out from a main body in FIG. 1A.

FIG. 1A is a three-dimensional view illustrating a portable electronic device according to an embodiment of the invention. FIG. 1B is a three-dimensional view illustrating a connector module protruded out from a main body in FIG. 1A. Referring to FIG. 1A and FIG. 1B, a portable electronic device 100 of the embodiment includes a main body 110 and a connector module 120. The main body 110 has a central region 112 and a fringe region 114, a thickness of the central region 112 is greater than a thickness of the fringe region 114, and the central region 112 has a containing cavity 112a. The connector module 120 is slidably disposed in the containing cavity 112a of the main body 110, and moves between an operation position L1 (shown in FIG. 1B) and an accommodation position L2 (shown in FIG. 1A) in relative to the main body 110. Therefore, when the connector module 120 is at the accommodation position L2, it may hide in the containing cavity 112a of the central region 112, hence, the thickness of the fringe region 114 may be reduced to conform the current trend of slim design of portable electronic devices.

Figure 2A:
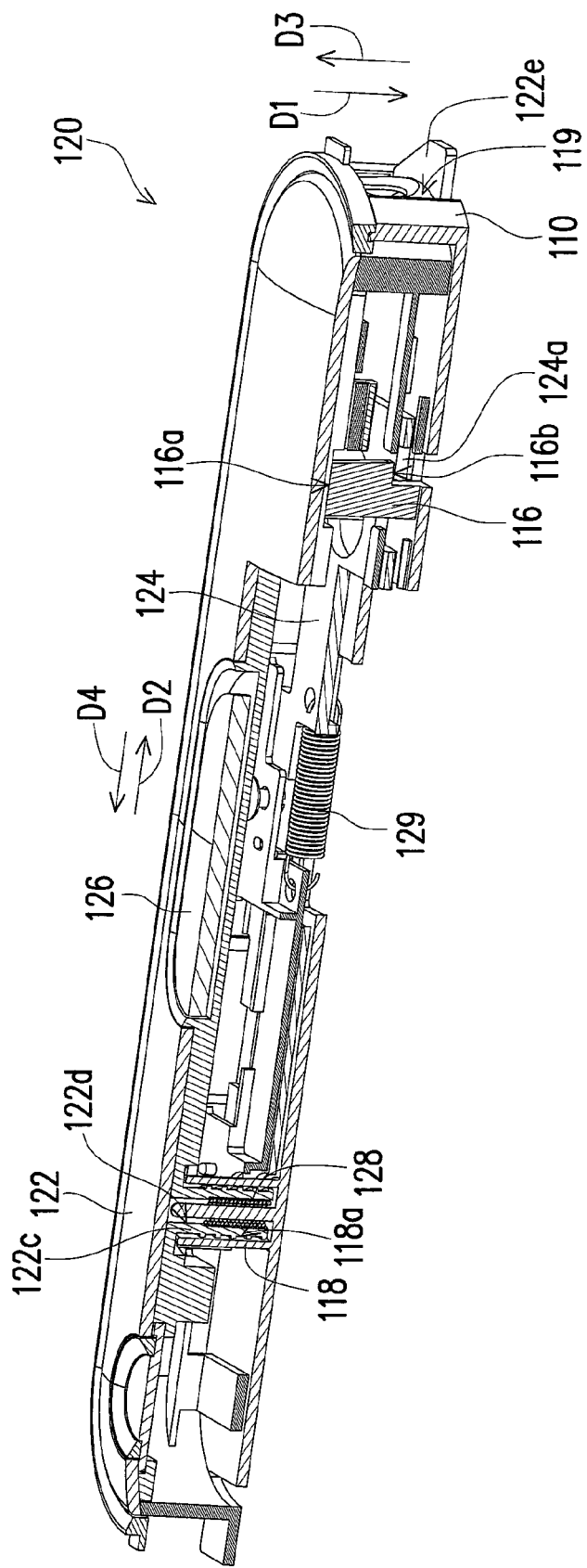
FIG. 2A is a partial three-dimensional view illustrating a portable electronic device in FIG. 1A.
Figure 2B:
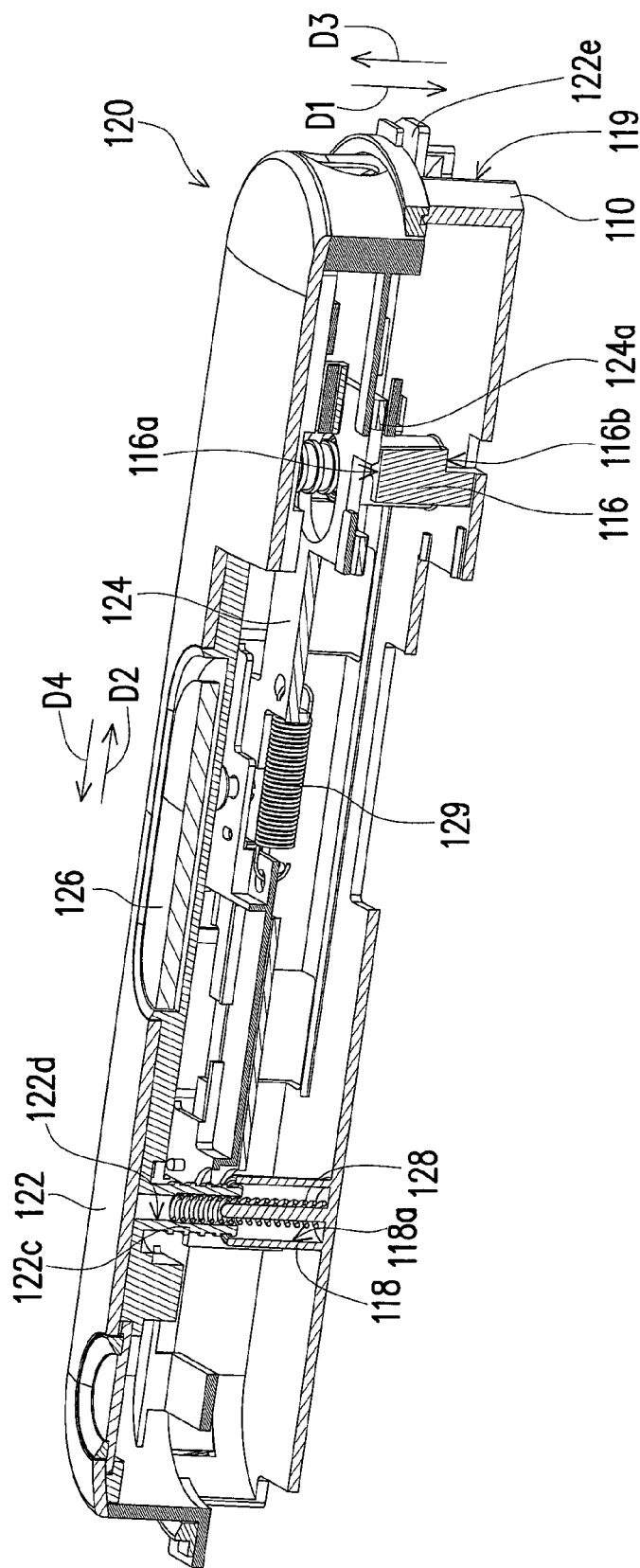
FIG. 2B is a partial three-dimensional view illustrating a portable electronic device in FIG. 1B.

Referring to FIG. 2A to FIG. 2B, the portable electronic device 100 of the embodiment further includes a stopping element 116, a housing 122 and a positioning element 124. The stopping element 116 is disposed on the main body 110 and has a first stopping portion 116a and a second stopping portion 116b. The housing 122 is slidably disposed in the main body 110. The positioning element 124 is slidably disposed in the housing 122 and leaned against the first stopping portion 116a to drive the housing 122 to be accommodated in the main body 110. In addition, in the embodiment, the connector module 120 further includes a knob 126, and the knob 126 is to drive the positioning element 124 to move.

Figure 3A:
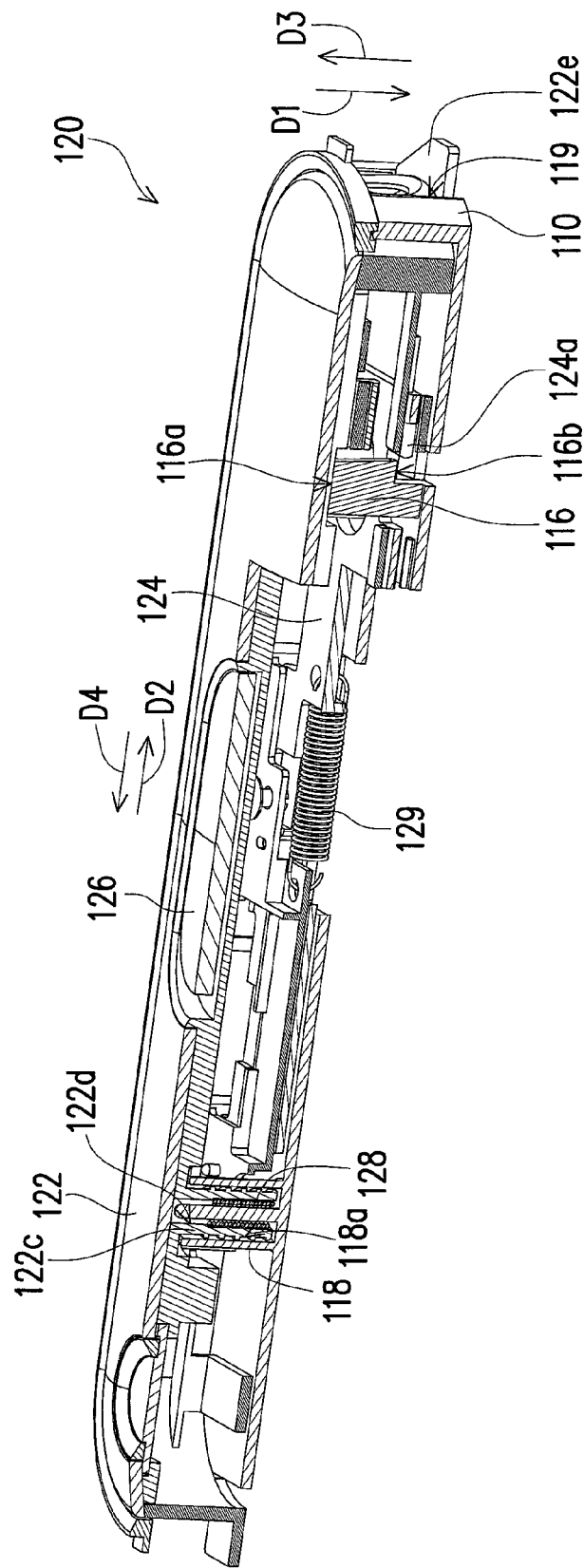
FIG. 3A and FIG. 3B diagrams illustrate an operational process of a connector module in FIG. 2A.
Figure 3B:
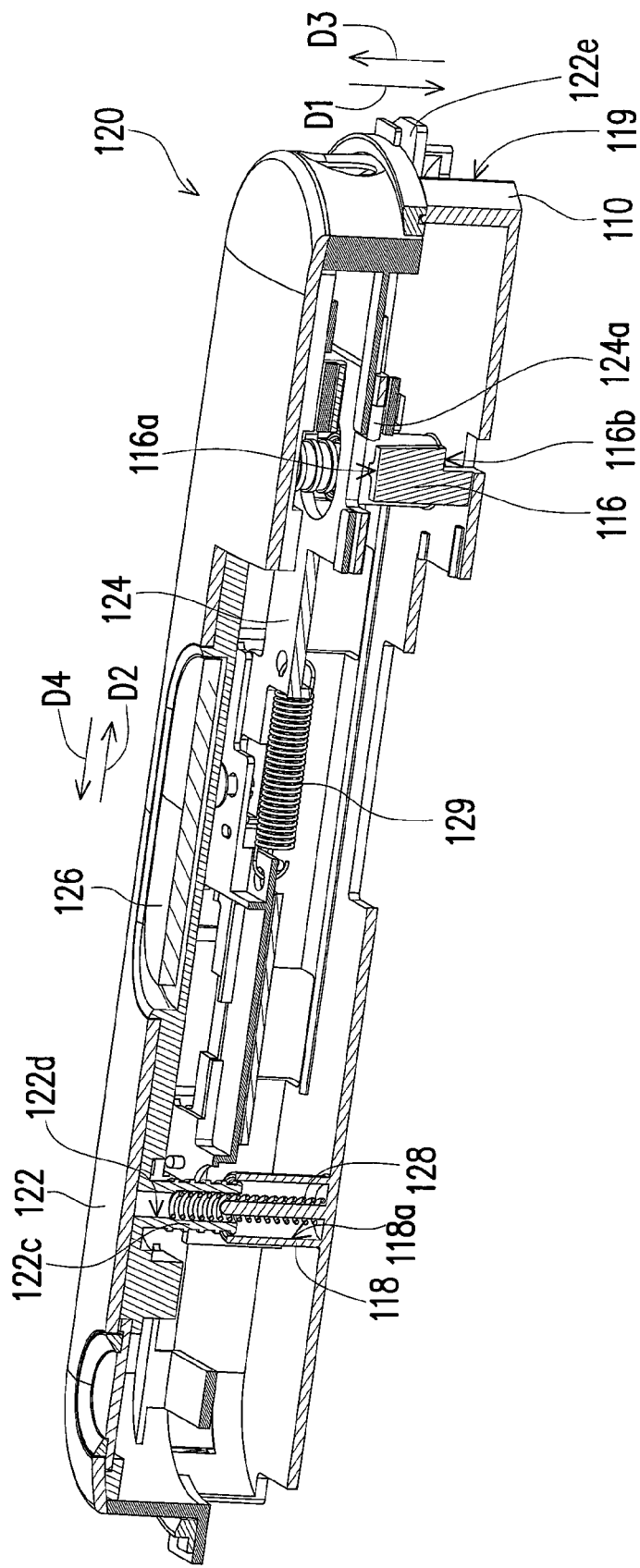

FIG. 3A and FIG. 3B diagrams illustrating an operational process of a connector module 120 in FIG. 2A. When the knob 126 is pushed and the positioning element 124 in relative to the housing 122 is driven to slide from the position illustrated in FIG. 2A to the position illustrated in FIG. 3A, the positioning element 124 may move away from the first stopping portion 116a and the housing 122 is suitable to protrude out from the main body 110 as illustrated in FIG. 3B. Next, the positioning element 124 is suitable to slide from the position illustrated in FIG. 3B to the position illustrated in FIG. 2B in relative to the housing 122 and lean against the second stopping portion 116b, so as to prevent the housing 122 being restored into the main body 110.

When the knob 126 is pushed and the positioning element 124 in relative to the housing 122 is driven to slide from the position illustrated in FIG. 2B to the position illustrated in FIG. 3B, the positioning element 124 may move away from the second stopping portion 116b and the housing 122 is suitable to be restored into the main body 110 as illustrated in FIG. 3A. Next, the positioning element 124 is suitable to slide from the position illustrated in FIG. 3A to the position illustrated in FIG. 2A in relative to the housing 122 and lean against the first stopping portion 116a.

Figure 4B:
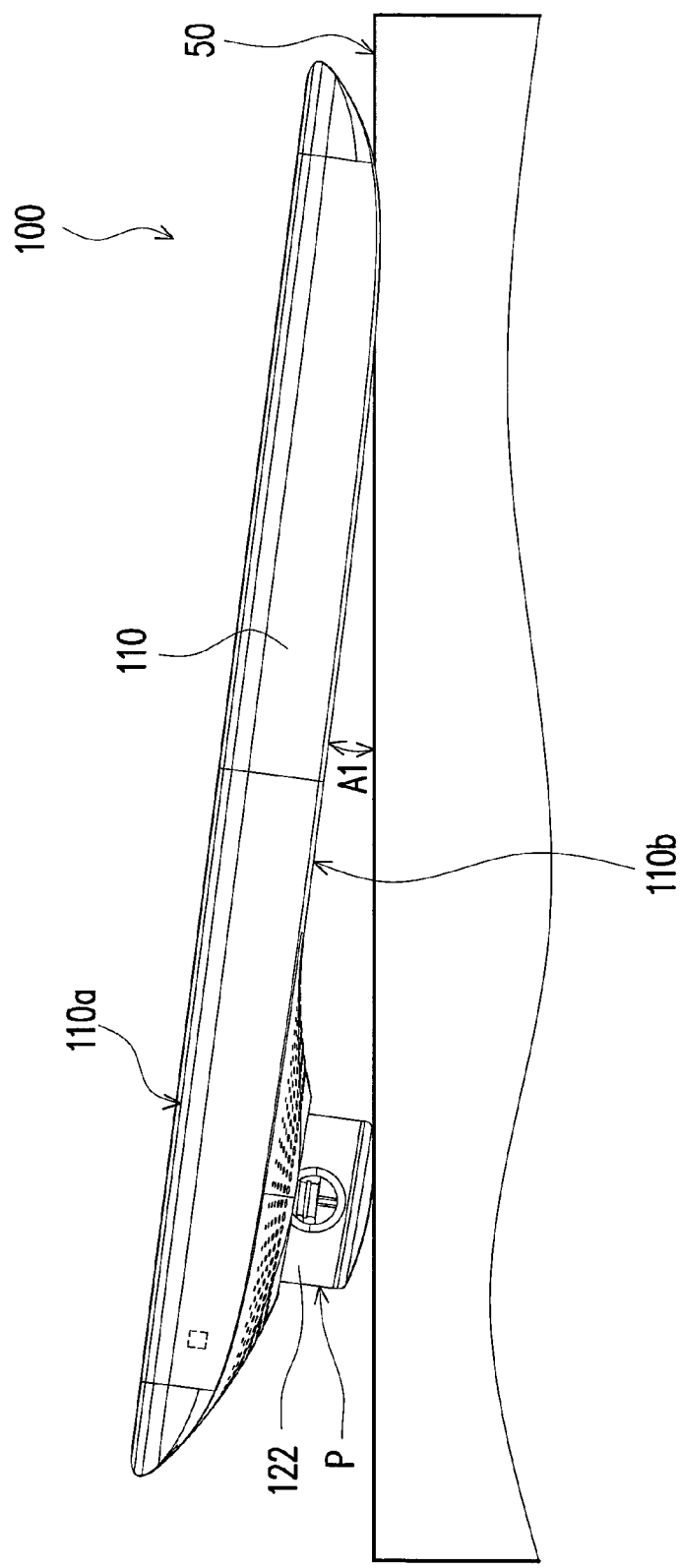
FIG. 4B is a side view illustrating a portable electronic device located on a working plane in FIG. 1B.

The main body 110 of the embodiment has a display surface 110a and a back surface 110b opposite to each other. When the connector module 120 is located in the containing cavity 112a of the main body 110 as illustrated in FIG. 1A and FIG. 2A, the main body 110 may be horizontally placed on a working plane 50. When the connector module 120 is protruded out from the back surface 110b of the main body 110 as illustrated in FIG. 1B, FIG. 2B and FIG. 4B, the connector module 120 is located at an operation position L1, and it may provide a supporting force to support the main body 110 away from a working plane 50, and an included angle A1 is formed between the main body 110 and the working plane 50.

Under the above-mentioned disposition arrangement, when the connector module 120 is located at the accommodation position L2, the housing 122 may be positioned by the stopping of the first stopping portion 116a to the positioning element 124 when it is located in the main body 110. A user may push the knob 126 in order for the positioning element 124 to move to remove the stopping of the first stopping portion 116a to the positioning element 124, which enables the connector module 120 is suitable to protrude out from the main body 110 and located at the operation position L1, and it is positioned by the stopping of the second stopping portion 116b to the positioning element 124, so as to allow the portable electronic device 100 to have an appropriate tilt angle for the user to watch or operate by the support of the housing 122 of the connector module 120. Thereby, the user may adjust the tilt angle of the portable electronic device 100 conveniently, so as to improve the convenience and comfort for utilizing the portable electronic device.

The detailed structure and operational process of the portable electronic device 100 are further described below. Referring to FIG. 2A and FIG. 2B, in the embodiment, the housing 122 is slidably disposed in the main body 110 along a first direction D1, the positioning element 124 is slidably disposed in the housing 122 along a second direction D2. The knob 126 is slidably disposed in the housing 122 along the second direction D2, and the first direction D1 is perpendicular to the second direction D2. The connector module 120 further includes a first elastic element 128 and a second elastic element 129. The first elastic element 128 is disposed between the housing 122 and the main body 110, and the second elastic element 129 is connected between the main body 110 and the positioning element 124.

When the positioning element 124 leans against the first stopping portion 116a as illustrated in FIG. 2A, the first elastic element 128 is compressed to store an elastic potential energy. When the user pushes the knob 126 to drive the positioning element 124 moving from the position illustrated in FIG. 2A along the second direction D2 to the position illustrated in FIG. 3A, the second elastic element 129 is stretched to store an elastic potential energy, the positioning element 124 moves away from the first stopping portion 116a, and the first elastic element 128 releases the elastic potential energy to drive the housing 122 illustrated in FIG. 3B by an elastic force to protrude out from the main body 110 along a third direction D3 opposite to the first direction D1. Next, when the user no longer pushes the knob 126, the second elastic element 129 releases the elastic potential energy to drive the positioning element 124 by the elastic force to be restored to the position illustrated in FIG. 2B along a fourth direction D4 opposite to the second direction D2, which enables the positioning element 124 to lean against the second stopping portion 116b.

In the embodiment, the first stopping portion 116a and the second stopping portion 116b described above respectively are a bottom surface and a top surface of the stopping element 116 opposite to each other. An end 124a of the positioning element 124 is suitable to lean against the bottom of the stopping element 116 as illustrated in FIG. 2A, so as to prevent the housing 122 to bounce up along the third direction D3. The end 124a of the positioning element 124 is suitable to lean against the top surface of the stopping element 116 as illustrated in FIG. 2B, so as to prevent the housing to be pressed down along the first direction D1.

Referring to FIG. 2A and FIG. 2B, in the embodiment, the inside of the housing 122 has a first pillar 122c, and the first pillar 122c has a first sliding opening 122d. The inside of the main body 110 has a second pillar 118, and the second pillar 118 has a second sliding opening 118a. The housing 122 is disposed in the second sliding opening 118a of the main body 110 by the first pillar 122c. In addition, the first elastic element 128 is disposed in the first sliding opening 122d and the second sliding opening 118a, so as to fix the position of the first elastic element 128. Furthermore, the main body 110 has a slot 119, a side of the housing 122 has a protrusion 122e, the protrusion 122e is slidably disposed in the slot 119, and the main body 110 limits a moving range of the protrusion 122e by the slot 119 to prevent the housing 122 detaching from the main body 110.

Referring to FIG. 1A and FIG. 1B, the housing 122 of the connector module 120 in the embodiment may not just have the function of supporting the portable electronic device 100, where the housing 122 of the connector module 120 has a connecting plane P, and the connecting plane P is disposed with a plurality of input/output connection ports 122a. The connector module 120 is to move between the operation position L1 and the accommodation position L2 in a direction approximately paralleled to the connecting plane P. When the housing 122 is located in the main body 110 as illustrated in FIG. 1A, the input/output connection ports 122a are covered by the main body 110 in order to prevent the input/output connection ports 122a to be contaminated by dust or liquid in the environment. When the housing 122 protrudes out from the main body 110 as illustrated in FIG. 1B, the input/output connection ports 122a are exposed by the main body 110 in order for the use to utilize.

Figure 5:
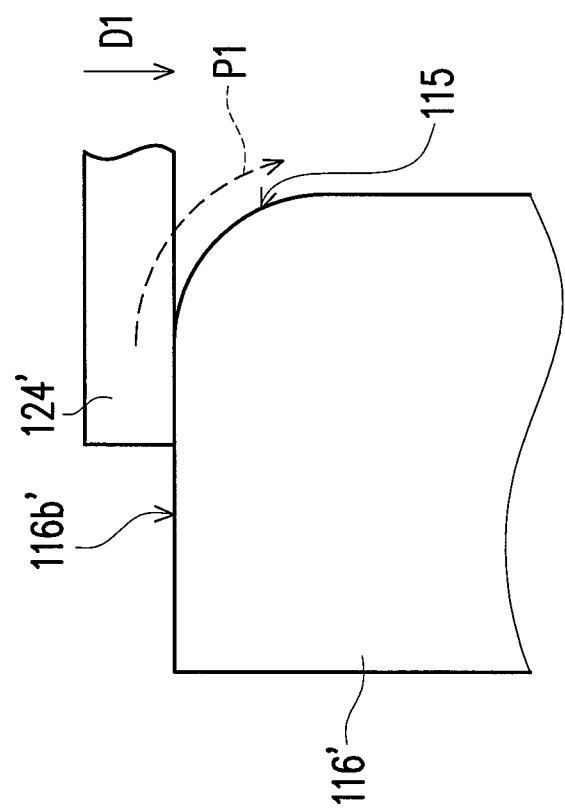
FIG. 5 is a schematic partial view illustrating a portable electronic device according to another embodiment of the invention.

FIG. 5 is a schematic partial view illustrating a portable electronic device according to another embodiment of the invention. The difference between the portable electronic device of the embodiment and the portable electronic device 100 in the aforementioned embodiment is only the shape of the second stopping portion. FIG. 5 only illustrates a partial of the stopping element 116' and a partial of the positioning element 124' in order for the figure to be clear. Referring to FIG. 5, a guiding fillet 115 may be formed at a second stopping portion 116b' of the stopping element 116', hence, when the positioning element 124' is given by a force along the first direction D1, the positioning element 124' may be moved away from the second stopping portion 116b' along a path P1 by the guiding of the guiding fillet 115. In comparison, the positioning element 124 as illustrated in FIG. 2B is required to be driven to move away from the second stopping portion 116b along the second direction D2 first, and it then may be driven along the first direction D1 to drive the housing 122 to move down. The positioning element 124' in FIG. 5 is only required to be given by a force along the first direction D1, and thus it is moved away from the second stopping portion 116b' by the guiding of the guiding fillet 115, which enables the user to operate more conveniently.

However, the structural disposition of the portable electronic device in the invention is not limited therein. Another embodiment is provided below, in which detailed description on other structural disposition arrangements and the operational process in the structure when the connector module protrudes out from the main body are described.

Figure 6A:
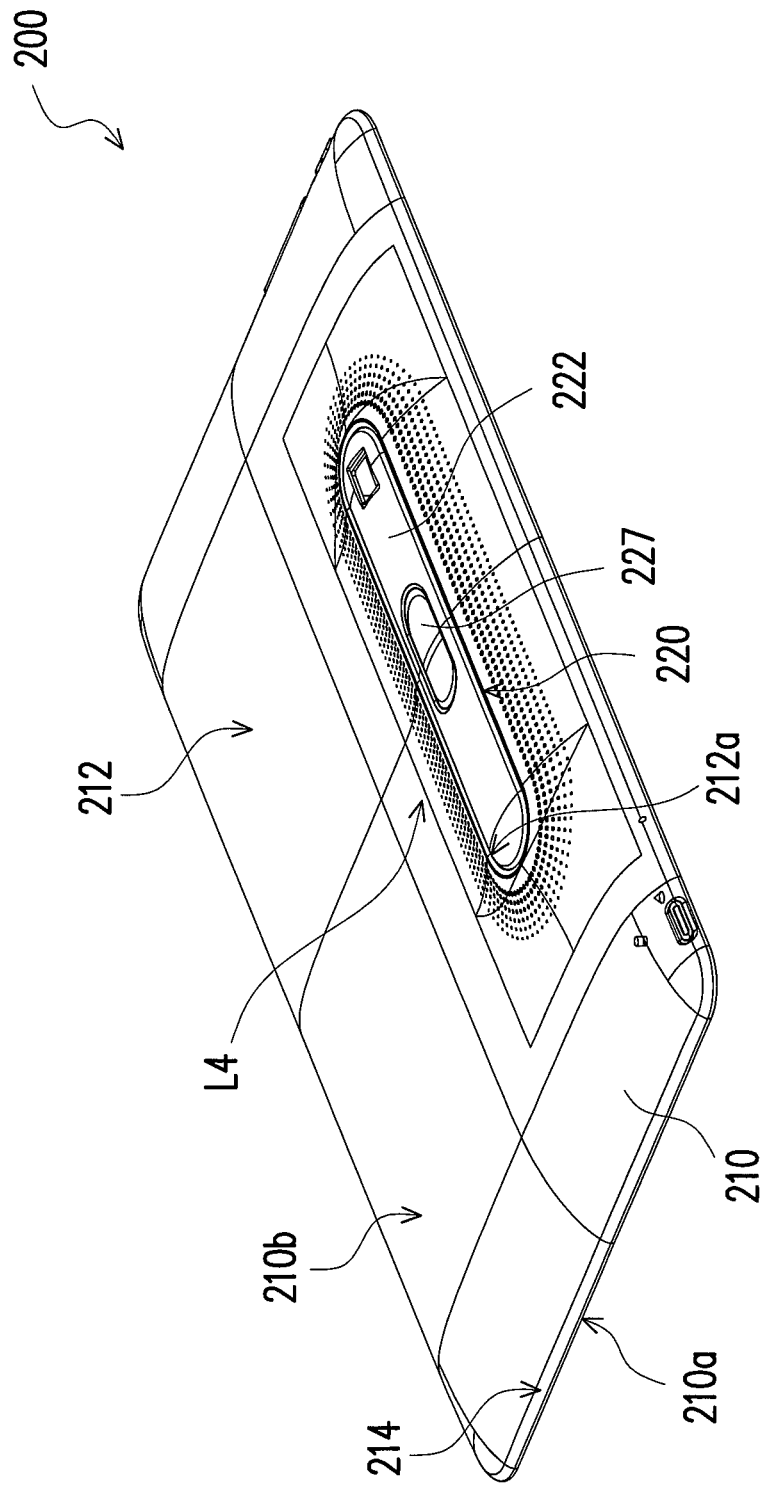
FIG. 6A is a three-dimensional view illustrating a portable electronic device according to yet another embodiment of the invention.
Figure 6B:
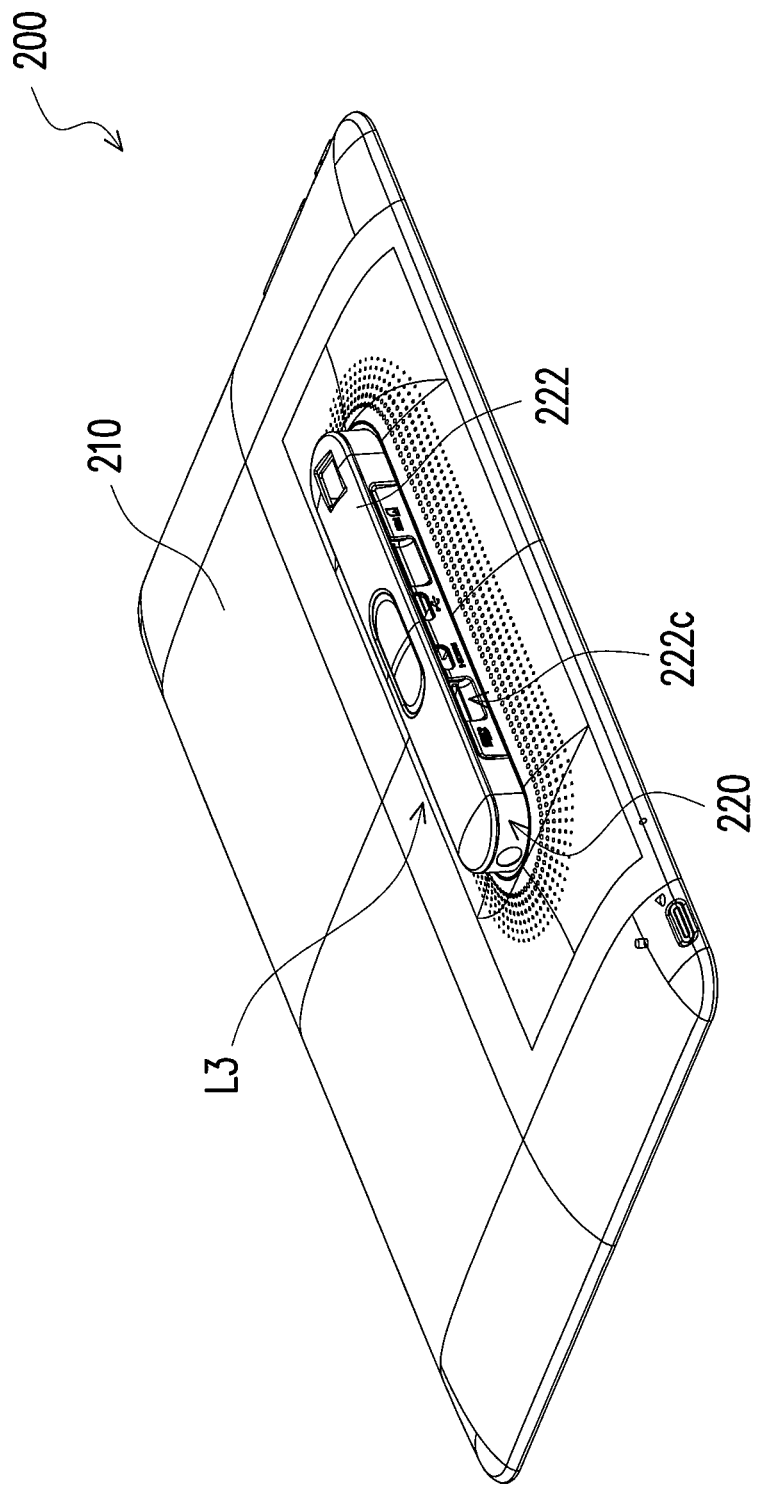
FIG. 6B is a three-dimensional view illustrating a connector module protruded out from a main body in FIG. 6A.

FIG. 6A and FIG. 6B are three-dimensional views illustrating a portable electronic device according to yet another embodiment of the invention. The portable electronic device 200 of the embodiment includes a main body 210 and a connector module 220. The main body 210 has a central region 212 and a fringe region 214, a thickness of the central region 212 is greater than a thickness of the fringe region 214, and the central region 212 has a containing cavity 212a. The connector module 220 is slidably disposed in the containing cavity 212a of the main body 210 and moves between an operation position L3 and an accommodation position L4 in relative to the main body 210.

Figure 7A:
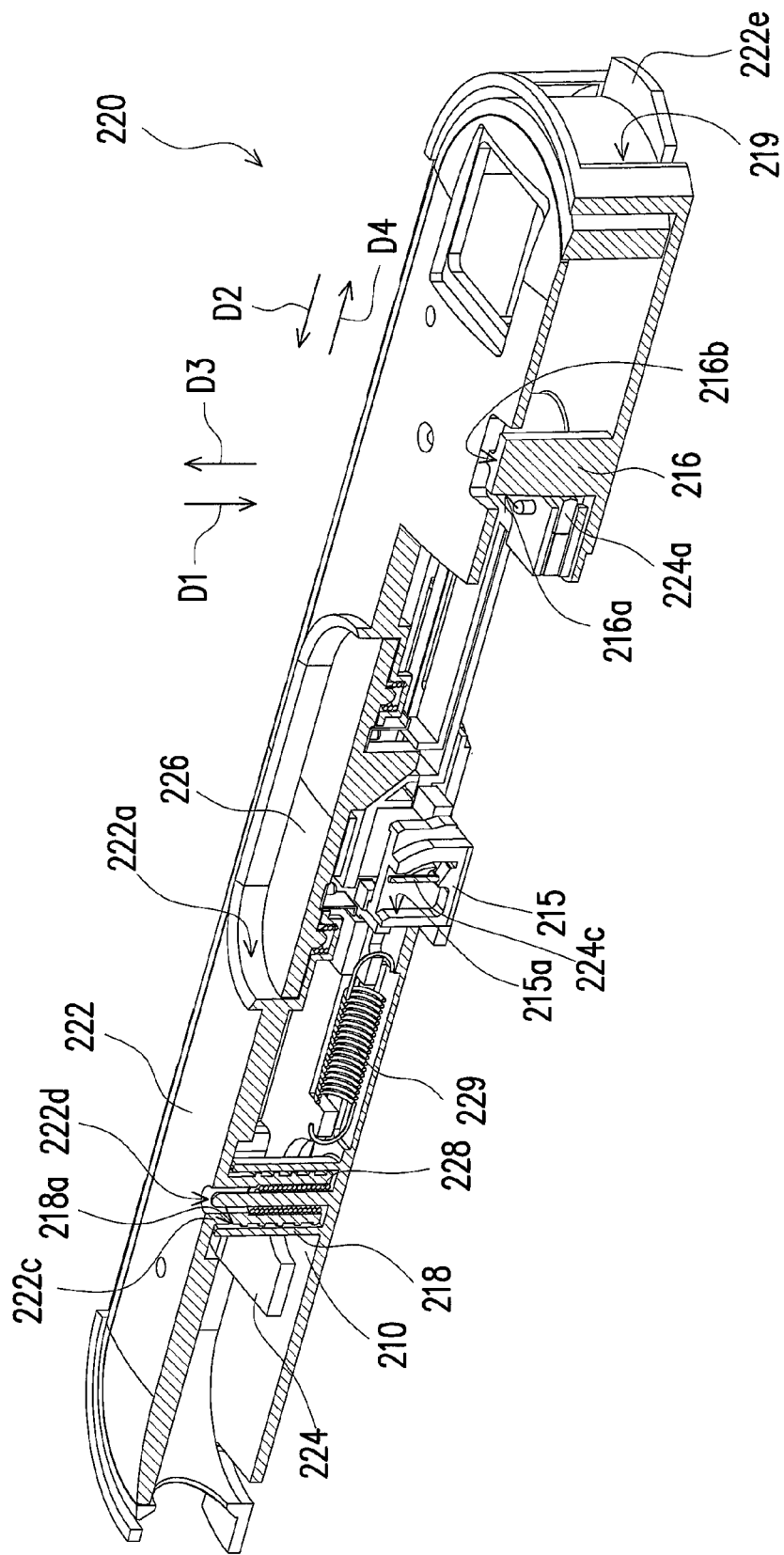
FIG. 7A is a partial three-dimensional view illustrating a button of a portable electronic device in FIG. 6A has been pressed.
Figure 7B:
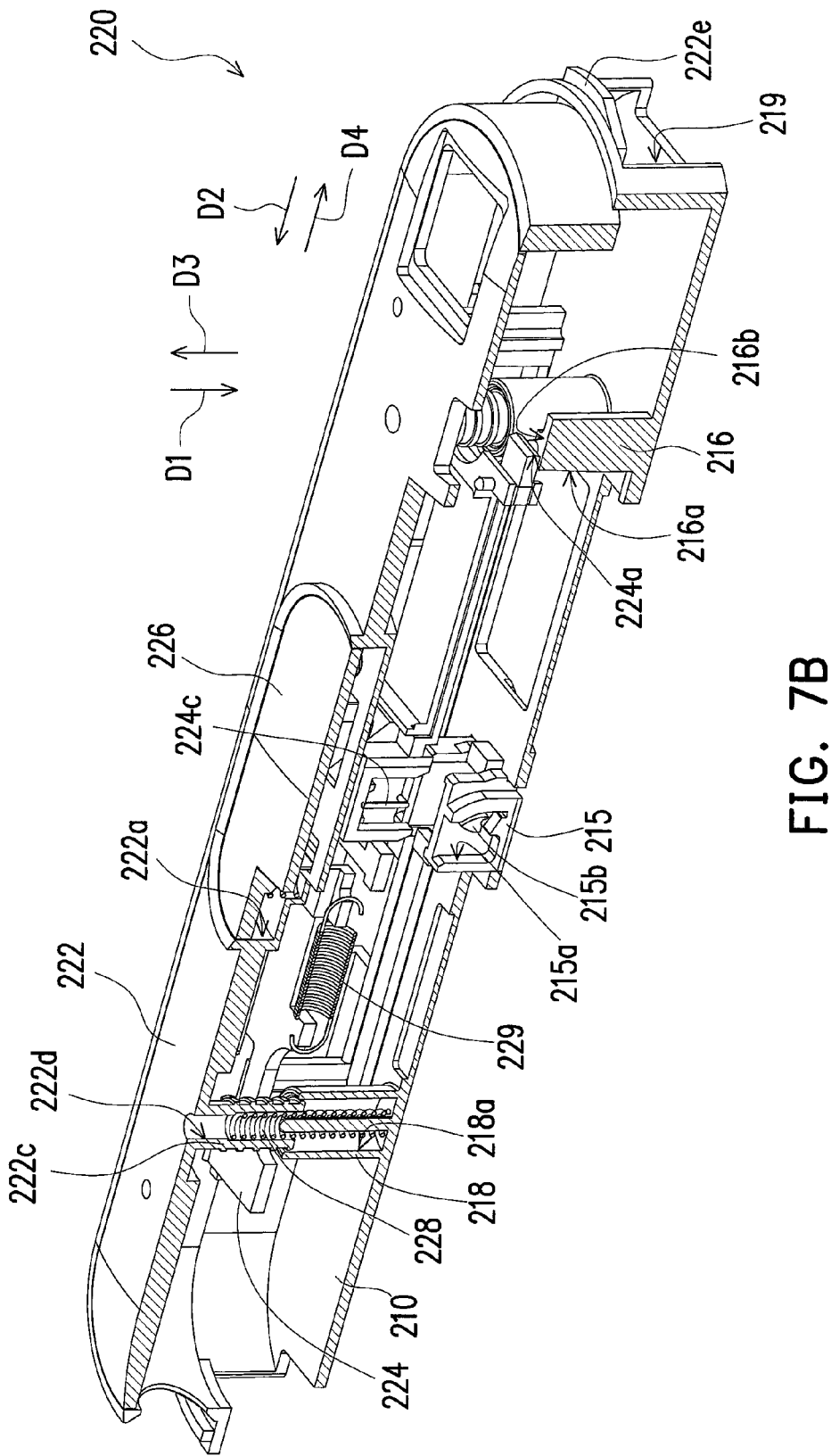
FIG. 7B is a partial three-dimensional view illustrating a portable electronic device in FIG. 6A.

Referring to FIG. 7A and FIG. 7B, the connector module 220 of the portable electronic device 200 in the embodiment further includes a position-limiting element 215, a housing 222 and a positioning element 224. The position-limiting element 215 is disposed in the main body 210, and the position-limiting element 215 has a track 215a. The track 215a has a position-limiting portion 215b. The housing 222 is slidably disposed in the main body 210. The positioning element 224 is slidably disposed in the housing 222 and has a moving portion 224c. Furthermore, in the embodiment, the connector module 220 further has a button 226 disposed in the housing 222 and driving the positioning element 224 to move.

When the moving portion 224c moves to the position-limiting portion 215b along the track 215a, the moving portion 224c is to interfere with the position-limiting portion 215b to stop moving and drive the housing 222 to be accommodated in the main body 210, as illustrated in FIG. 6A and FIG. 7A. When the pressed button 226 illustrated in FIG. 7A pushes the positioning element 224 to remove the interference of the moving portion 224c and the position-limiting portion 215b, the housing 222 is suitable to protrude out from the main body 210 as illustrated in FIG. 6B and FIG. 7B and drive the moving portion 224c to be separated from the position-limiting element 215.

Under the aforementioned disposition arrangement, the connector module 220 is located at the accommodation position L4, the housing 222 is positioned by the moving portion 224c of the positioning element 224 and the position-limiting portion 215b latch with each other when it is located in the main body 210. A user may press the button 226 to press down the housing 222, so as to remove the latch of the position-limiting portion 215b to the moving portion 224c, so that the housing 222 is suitable to protrude out from the main body 210, and the connector module 220 is positioned at the operation position L3 by the structural interference between the positioning element 224 and the main body 210 to enable the portable electronic device 200 to have an appropriate tilt angle by the support of the housing 222 for the user to watch or operate.

Referring to FIG. 7A and FIG. 7B, in the embodiment, the housing 222 is slidably disposed in the main body 210 along a first direction D1, and the positioning element 224 is slidably disposed in the housing 222 along a second direction D2. The button 226 is slidably disposed in the housing 222 along the first direction D1, and the first direction D1 is perpendicular to the second direction D2. The housing 222 has an opening 222a, and the button 226 is slidably disposed in the opening 222a along the first direction D1. The opening 222a is utilized to expose the button 226 for a user to press, and the button 226 is limited to only allow moving along the first direction D1 and a third direction D3 opposite to the first direction D1.

The connector module 220 further includes a first elastic element 228 and a second elastic element 229. The first elastic element 228 is connected between the housing 222 and the main body 210, and the second elastic element 229 is connected between the main body 210 and the positioning element 224. The main body 210 has a stopping element 216. The stopping element 216 has a side surface 216a and a top surface 216b, and the positioning element 224 has a stopping portion 224a. When the moving portion 224c moves away from the track 215a, the stopping portion 224a and the stopping element 216 interfere to each other to prevent the housing 222 being restored into the main body 210. When the positioning element 224 is latched with the position-limiting portion 215b and positioned, the second elastic element 229 is under the state of being stretched and stores an elastic potential energy, and the first elastic element 228 is under the state of being compressed and stores an elastic potential energy. Furthermore, the side surface 216b of the stopping element 216 blocks the positioning element 224 to slide in relative to the housing 222 along a fourth direction D4 opposite to the second direction D2.

Figure 7C:
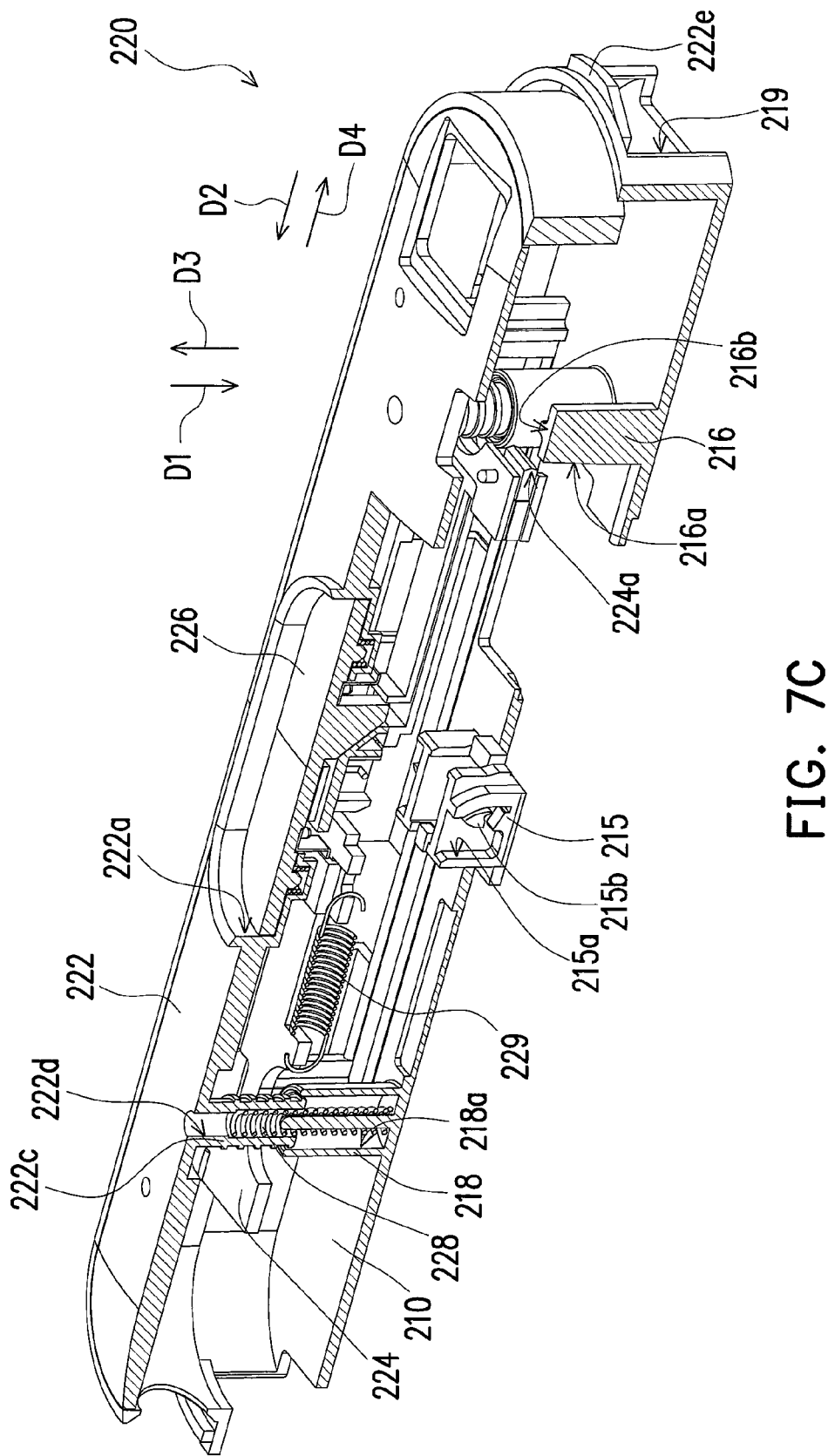
FIG. 7C is a schematic view illustrating a positioning element following with the moving up of a housing in FIG. 7A.

When the pressed button 226 illustrated in FIG. 7A pushes the positioning element 224 to remove the latch of the positioning element 224 and the position-limiting element 215, the first elastic element 228 releases the elastic potential energy as illustrated in FIG. 7C, and drives the housing 222 by an elastic force thereof to bounce up along the third direction D3 and to protrude out from the main body 210. At this moment, the stopping portion 224a of the positioning element 224, following the moving up of the housing 222, is located on the top surface 216b of the stopping element 216, and the second elastic element 229 releases the elastic potential energy and drives the positioning element 224 by the elastic force thereof to slide in relative to the housing 222 along the fourth direction D4. At this moment, the stopping portion 224a of the positioning element 224, following the sliding of the positioning element 224 in relative to the housing 222, is leaned against the top surface 216b of the stopping element 216 as illustrated in FIG. 7B, so that the positioning element 224 and the main body 210 construct the aforementioned structural interference.

Contrarily, when a user is intended to remove the structural interference of the positioning element 224 and the main body 210 in FIG. 7B, the button 226 may be pressed in order for the button 226 to push the positioning element 224 to move along the second direction D2 as illustrated in FIG. 7C, which enables the stopping portion 224a of the positioning element 224 to move away from the top surface 216b of the stopping element 216. At this moment, the moving portion 224c, following the sliding of the positioning element 224, is aligned to the position-limiting element 215. Next, the housing 222 may move along the first direction D1 and drive the moving portion 224c of the positioning element 224 to move to and to be latched with the position-limiting element 215.

Referring to FIG. 7A and FIG. 7B, in the embodiment, the inside of the housing 222 has a first pillar 222c, and the first pillar 222c has a first sliding opening 222d. The inside of the main body 210 has a second pillar 218, and the second pillar 218 has a second sliding opening 218a. The housing 222 is slidably disposed in the second sliding opening 218a of the main body 210 by the first pillar 218. In addition, the first elastic element 228 is disposed in the first sliding opening 222d and the second sliding opening 218a, so as to fix the position of the first elastic element 228. Furthermore, the main body 210 has a slot 219, a side of the housing 222 has a protrusion 222e, the protrusion 222e is slidably disposed in the slot 219, and the main body 210 limits a moving range of the protrusion 222e by the slot 219 to prevent the housing 222 detaching from the main body 210.

Figure 8:
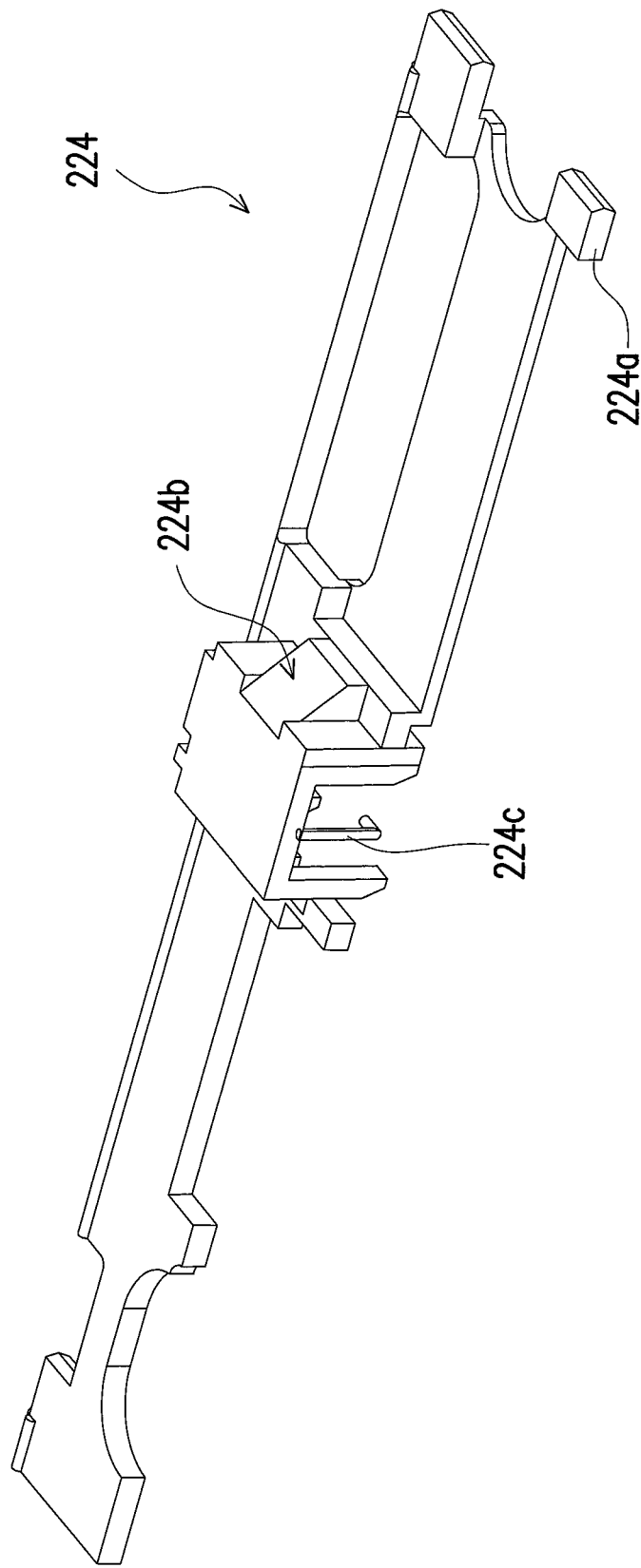
FIG. 8 is a three-dimensional view illustrating a positioning element in FIG. 6A.

FIG. 8 is a three-dimensional view illustrating a positioning element in FIG. 6A. Referring to FIG. 8, the positioning element 224 of the embodiment has an inclined plane 224b. Under the state of FIG. 7B, the button 226 may be pressed to push the inclined plane 224b along the first direction, so as to drive the positioning element 224 to slide in relative to the housing 222 along the second direction D2, so that an end 224a of the positioning element 224 moves away from the top surface 216b of the stopping element 216 as illustrated in FIG. 7C. At this moment, the structural interference of the end 224a of the positioning element 224 and the top surface 216b of the stopping element 216 is removed, therefore, the user may continue to press the button 226 to drive the housing 222 to be restored into the main body 210 along the first direction D1, which is the state illustrated in FIG. 7A.

Figure 9:
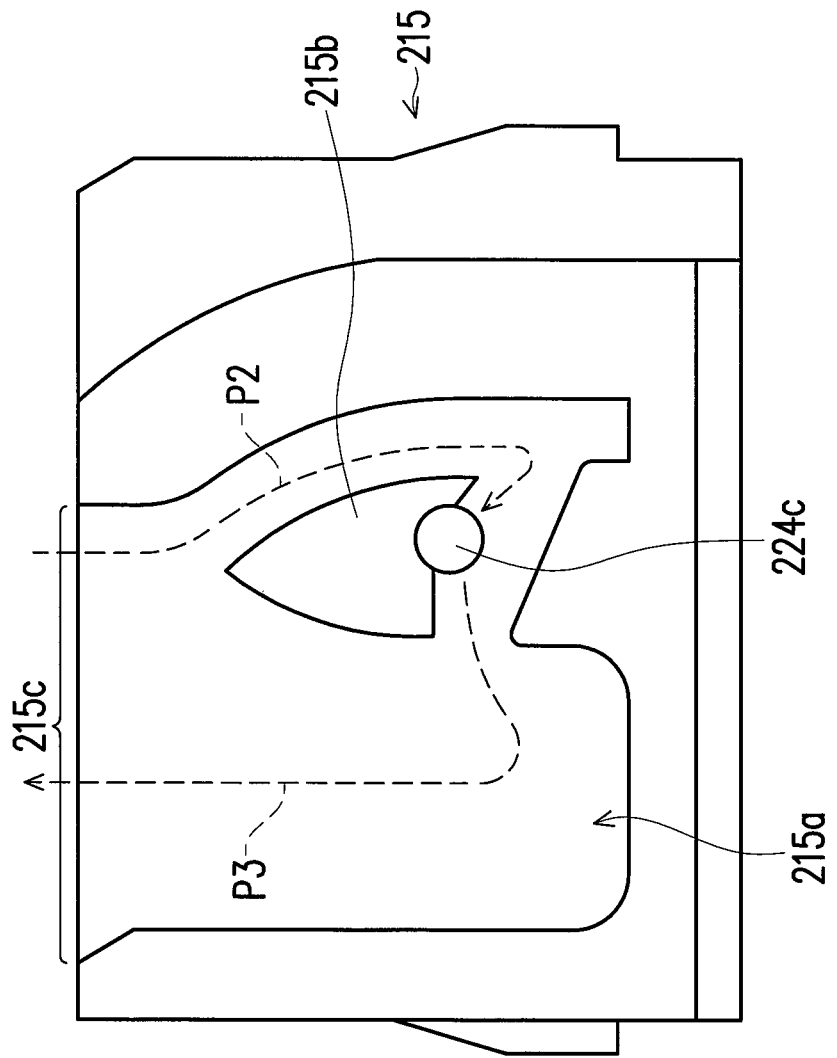
FIG. 9 is a schematic view illustrating a positioning portion located in a position-limiting element in FIG. 7B.

More specifically, FIG. 9 is a schematic view illustrating a positioning portion of a positioning element located in a position-limiting element in FIG. 7B. When the button 226 is pressed to drive the moving portion 224c reaching into the position-limiting element 215 through an access opening 215c, the moving portion 224c moves along a path P2 within the track 215a illustrated in FIG. 9 to and is latched with the position-limiting portion 215d. When the button 226 is pressed again to remove the latch of the moving portion 224c and the position-limiting portion 215d, the moving portion 224c is suitable to move away from the position-limiting portion 215d along a path P3 within the track 215a and move towards the access opening 215c, and the positioning portion 224 moves away from the position-limiting portion 215 through the access opening 215c, so that the entire structure is converted to the state as illustrated in FIG. 7B.

According to the above description, in the portable electronic device of the invention, the connector module is slidably disposed on the central region of the main body. When the connector module is at the accommodation position, it may be hidden in the containing cavity of the central region, so that the fringe region of the portable electronic device may have a thinner thickness in order for the entirety to obtain more unique aesthetic sense. On the contrary, when the connector module is at the operation position, it may support the portable electronic device to have an appropriate tilt angle for a user to watch or operate. Thereby, the user may adjust the tilt angle of the portable electronic device conveniently to improve the convenience and comfort for utilizing the portable electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A portable electronic device, comprising:
 a main body having a central region and a fringe region, wherein a thickness of the central region is greater than a thickness of the fringe region, and the central region has a containing cavity; and
 a connector module slidably disposed in the containing cavity of the main body and moving between an operation position and an accommodation position in relative to the main body, wherein the connector module further comprises:
  a stopping element disposed on the main body and having a first stopping portion and a second stopping portion;
  a housing slidably disposed in the main body;
  a positioning element slidably disposed in the housing and leaned against the first stopping portion to drive the housing to be accommodated in the main body, wherein when the positioning element moves away from the first stopping portion, the housing is suitable to protrude out from the main body, and the positioning element slides in relative to the housing and leans against the second stopping portion to prevent the housing being restored into the main body; and
  a knob driving the positioning element to move, wherein the housing is slidably disposed in the main body along a first direction, the positioning element is slidably disposed in the housing along a second direction, the knob is slidably disposed in the housing along the second direction, and the first direction is perpendicular to the second direction.

2. The portable electronic device as claimed in claim 1, wherein when the connector module is located at the operation position, the connector module provides a supporting force to support the main body away from a working plane.

3. The portable electronic device as claimed in claim 1, wherein a depth of the containing cavity is greater than the thickness of the fringe region.

4. The portable electronic device as claimed in claim 1, wherein the connector module has at least one input/output connection port, when the connector module is located at the operation position, the input/output connection port is exposed outside the main body, and when the connector module is located at the accommodation position, the input/output connection port is hidden in the main body.

5. The portable electronic device as claimed in claim 1, wherein when the connector module is located at the operation position and supports the main body away from a working plane, an included angle is formed between the main body and the working plane.

6. The portable electronic device as claimed in claim 1, wherein the connector module has a connecting plane, and the connector module moves between the operation position and the accommodation position in a direction approximately paralleled to the connecting plane.

7. The portable electronic device as claimed in claim 1, wherein when the positioning element moves away from the second stopping portion and the housing is restored into the main body, the positioning element slides in relative to the housing and leans against the first stopping portion.

8. The portable electronic device as claimed in claim 1, wherein the connector module further comprises a first elastic element connected between the housing and the main body, wherein when the positioning element leans against the first stopping portion, the first elastic element stores an elastic potential energy, and when the positioning element moves away from the first stopping portion, the first elastic element releases the elastic potential energy and drives the housing to protrude out from the main body.

9. The portable electronic device as claimed in claim 1, wherein the main body has a slot, a side of the housing has a protrusion, the protrusion is slidably disposed in the slot, and the slot limits a moving range of the protrusion.

10. The portable electronic device as claimed in claim 1, wherein the connector module further comprises a second elastic element connected between the main body and the positioning element, wherein when the positioning element slides in relative to the housing, the second elastic element stores an elastic potential energy, and the second elastic element is suitable to release the elastic potential energy to drive the positioning element to be restored.

11. The portable electronic device as claimed in claim 1, wherein the second stopping portion has a guiding fillet, and the positioning element is suitable to move away from the second stopping portion along the guiding fillet.

* * * * *